(12) United States Patent
Narusawa

(10) Patent No.: US 7,509,570 B2
(45) Date of Patent: Mar. 24, 2009

(54) LAYOUT CONTROL FOR IMAGE OUTPUT

(75) Inventor: Hideyuki Narusawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1090 days.

(21) Appl. No.: 10/264,311

(22) Filed: Oct. 2, 2002

(65) Prior Publication Data

US 2003/0093759 A1    May 15, 2003

(30) Foreign Application Priority Data

Oct. 4, 2001   (JP) .............................. 2001-308557

(51) Int. Cl.
 G06F 15/00   (2006.01)
 G06F 17/00   (2006.01)
(52) U.S. Cl. ................. 715/211; 715/243; 715/244; 715/245; 715/246; 715/247; 715/252; 715/253; 345/629; 345/630; 345/631; 345/632; 345/634; 345/635; 345/636; 345/637; 345/638; 345/639; 345/640; 345/641
(58) Field of Classification Search ......... 715/517–521, 715/501.1; 345/629–641
 See application file for complete search history.

(56) References Cited

U.S. PATENT DOCUMENTS

| | | | |
|---|---|---|---|
| 6,088,708 A * | 7/2000 | Burch et al. ................. | 715/509 |
| 6,719,466 B2 | 4/2004 | Edatsune et al. | |
| 6,727,909 B1 * | 4/2004 | Matsumura et al. ......... | 345/629 |
| 6,754,379 B2 * | 6/2004 | Xiong et al. ................. | 382/154 |
| 6,856,422 B1 * | 2/2005 | Higashibata et al. ....... | 358/1.18 |
| 6,944,328 B2 * | 9/2005 | Yoshida ....................... | 382/154 |
| 2002/0095439 A1 * | 7/2002 | Long et al. .................. | 707/507 |
| 2002/0178950 A1 * | 12/2002 | Delhoune et al. ........... | 101/481 |
| 2006/0150091 A1 * | 7/2006 | Suzuki et al. ................ | 715/517 |

FOREIGN PATENT DOCUMENTS

| | | |
|---|---|---|
| JP | 62-152078 | 7/1987 |
| JP | 07-078245 | 3/1995 |
| JP | 07-295971 | 11/1995 |
| JP | 10-011531 | 1/1998 |

(Continued)

OTHER PUBLICATIONS

Abstract of Japanese Patent Pub. No. 2001-157031, Pub. Date: Jun. 8, 2001, Patent Abstracts of Japan.

(Continued)

*Primary Examiner*—Doug Hutton
*Assistant Examiner*—Nathan Hillery
(74) *Attorney, Agent, or Firm*—Martine Penilla & Gencarella, LLP

(57) ABSTRACT

The object of the invention is to easily and simply output a document including an image in a desired layout.

A script generation device 10 generates a script used to control a layout of a printer 20, and transfers the generated script to the printer 20. The script includes multiple drawing control commands that individually adjust output positions with regard to a plurality of images to be output in a preset output range. The sequence of arrangement of the multiple drawing control commands specifies the overlapping state of the plurality of images. The script of this construction enables the user to readily define and change the overlapping state and thereby attain a desired layout.

3 Claims, 20 Drawing Sheets

FOREIGN PATENT DOCUMENTS

| | | |
|---|---|---|
| JP | 2000-168187 | 6/2000 |
| JP | 2001-157031 | 6/2001 |
| WO | WO 01/83222 A1 | 11/2001 |

OTHER PUBLICATIONS

Abstract of Japanese Patent Publication No. 62-152078, Pub. Date: Jul. 7, 1987, Patent Abtracts of Japan.

Abstract of Japanese Patent Publication No. 07-078245, Pub. Date: Mar. 20, 1995, Patent Abstracts of Japan.

Abstract of Japanese Patent Publication No. 07-295971, Pub. Date: Nov. 10, 1995, Patent Abstracts of Japan).

Abstract of Japanese Patent Publication No. 10-011531, Pub. Date: Jan. 16, 1998, Patent Abstracts of Japan.

Abstract of Japanese Patent Publication No. 2000-168187, Pub. Date: Jun. 20, 2000, Patent Abstracts of Japan.

* cited by examiner

Fig.6

```
L1   [HEADER]
L2   HdRevision=02.00
L3   HdAuthor="SEIKO EPSON Corporation"
L4   HdCopyright="SEIKO EPSON Corporation"
L5   HdChangeFlag=Possible
L6   HdKeyWord="Cristmas","Greeting"
L7   HdTitle="EPSON Script Sample"
L8   HdComment="Test Sample"
L9   HdDirection=Vertical
L10  HdSound="..\EPUDL\GSOUND.PCM"
L11  HdCapacity=1024000
L12  HdThumbnail="..\EPUDL\IMAGE\001UDL.USF"
L13  HdPhysicalPaperSize = R89
L14  HdMargines = 3,3,3,3

L15  [PAGE]
L16  ;DrawLayer-Image
L17  DrawPicture("..\EPUDL\IMAGE\001.EFF", 0, 10, 20, 100, 200, 0, 1, 4)
L18  DrawPicture("", 1, 50, 100, 1500, 1200, 2, 1, 4)
L19  DrawPicture("", 2, 50, 100, 1500, N, 1, 1, 4)
L20  ;DrawStrings
L21  DrawStrings("..\EPUDL\IMAGE\001.EFF", 0, "%G %d, %y", 100, 200, 200, 300, 0,
L22         "Mincho", 0, 128, 128, 128)
L23  ;DrawLayer-Line
L24  DrawLine( 10, 20, 10, 200, 5, 255, 0, 0)
```

Fig.7A

| Format | [HEADER] |
|---|---|
| Details | Include version management information of the editor. Include information mainly used when the editor manages multiple script files. |
| Number of Description | 1 (in Script File) |
| Description Level | Mandatory |

Fig.7B

| Sequence of Description | Name of Parameter | Description Level | Outlines | Remarks |
|---|---|---|---|---|
| 1 | HdRevision | M | Editor Version | Utility Function |
| 2 | HdAuthor | O | Name of Author | Utility Function |
| 3 | HdCopyright | O | Name of Copyright Holder | Utility Function |
| 4 | HdCopyFlag | O | Copy Right | Utility Function |
| 5 | HdChangeFlag | O | Change Right | Utility Function |
| 6 | HdKeyWord | O | Keyword for Retrieval | Utility Function |
| 7 | HdTitle | O | Title | Utility Function |
| 8 | HdComment | O | Comment | Utility Function |
| 9 | HdDirection | M | Direction of Layout | Utility Function |
| 10 | HdSound | O | Name of Audio File | |
| 11 | HdCapacity | O | Capacity of Object | |
| 12 | HdThumbnail | O | Name of Thumbnail Image | |
| 13 | HdPhysicalPaperSize | M | Size of Printing Paper | |
| 14 | HdMargines | M | Margins | |
| 15 | HdRollPaperLength | O | Specification of Page Length of Roll Paper | |
| 16 | HdApplication | O | Specification of Application Section | |

Fig.8A

| Format of Parameter Name | HdRevison |
|---|---|
| Number of Description in Section | 1 (Limited in Header Section) |
| Description Level | Mandatory |
| Format of Parameter Value | A numerical value including two figures before the decimal point (Media Number) and two figures after the decimal point (Minor Number) |
| Description | Represent the version number of the software. |
| Example | HdRevision=02.10 |

Fig.8B

| Format of Parameter Name | HdAuthor |
|---|---|
| Number of Description in Section | 1 (Limited in Header Section) |
| Description Level | Option |
| Format of Parameter Value | Letter codes (20h to 7Eh) of not greater than 128 letters and Japanese codes (Shift-JIS). The letter string codes are to be quoted with " ". |
| Description | Represent the name of the author or the company name. |
| Example | HdAuthor = "SEIKO EPSON Corporation" |

Fig.8C

| Format of Parameter Name | HdCopyright |
|---|---|
| Number of Description in Section | 1 (Limited in Header Section) |
| Description Level | Option |
| Format of Parameter Value | Letter codes (20h to 7Eh) of not greater than 128 letters and Japanese codes (Shift-JIS). The letter string codes are to be quoted with " ". |
| Description | Represent the name of the copyright holder of the script file. |
| Example | HdCopyright="SEIKO EPSON Corporation" |

Fig.8D

| Format of Parameter Name | HdCopyFlag |
|---|---|
| Number of Description in Section | 1 (Limited in Header Section) |
| Description Level | Option |
| Format of Parameter Value | Specify either of two statuses:<br>Possible : Copy Permitted<br>Impossible : Copy Forbidden |
| Description | Represent the flag showing whether copy of the script file is permitted or forbidden. |
| Example | HdCopyFlag=Possible |

Fig.9A

| Format of Parameter Name | HdChangeFlag |
|---|---|
| Number of Description in Section | 1 (Limited in Header Section) |
| Description Level | Option |
| Format of Parameter Value | Specify either of two statuses:<br>Possible : Change Permitted<br>Impossible : Change Forbidden |
| Description | Represent the flag showing whether change of the script file is permitted or forbidden. |
| Example | HdCopyFlag=Impossible |

Fig.9B

| Format of Parameter Name | HdKeyWord |
|---|---|
| Number of Description in Section | 1 (Limited in Header Section) |
| Description Level | Option |
| Format of Parameter Value | One keyword includes letter codes (20h to 7Eh) of not greater than 128 bytes and Japanese codes (Shift-JIS). Multiple keywords may be defined. The letter string codes of one keyword are to be quoted with " ".<br>The comma ',' is to be given between keywords. |
| Description | Represent the keyword for retrieval of the script file May include multiple keywords. |
| Example | HdKeyWord="1999","December","Christmas","CARD" |

Fig.9C

| Format of Parameter Name | HdTitle |
|---|---|
| Number of Description in Section | 1 (Limited in Header Section) |
| Description Level | Option |
| Format of Parameter Value | Letter codes (20h to 7Eh) of not greater than 128 letters and Japanese codes (Shift-JIS). The letter string codes are to be quoted with " ".<br>The method of printing or display follows the individual specification of Reader. |
| Description | Represent the title. |
| Example | HdTitle="Christmas Card Layout" |

Fig.10A

| Format of Parameter Name | HdComment |
|---|---|
| Number of Description in Section | 1 (Limited in Header Section) |
| Description Level | Option |
| Format of Parameter Value | Letter codes (20h to 7Eh) of not greater than 128 letters and Japanese codes (Shift-JIS). The letter string codes are to be quoted with " ". The method of printing or display follows the individual specification of Reader. |
| Description | Represent the comment. |
| Example | HdComment="1999-Christmas Card" |

Fig.10B

| Format of Parameter Name | HdDirection |
|---|---|
| Number of Description in Section | 1 (Limited in Header Section) |
| Description Level | Mandatory |
| Format of Parameter Value | Specify either of two statuses:<br>Vertical : Edit in the vertical direction (Portrait)<br>Horizontal: Edit in the horizontal direction (Landscape) |
| Description | Define the layout direction of printing paper. Determine the direction of printing paper, vertical or horizontal, in edition by the editor. |
| Example | HdDirection=Vertical |

Fig.10C

| Format of Parameter Name | HdSound |
|---|---|
| Number of Description in Section | 1 (Limited in Header Section) |
| Description Level | Option |
| Format of Parameter Value | The name of an audio file is quoted with " ". The file name is specified by a relative path from the script file storage directory. |
| Description | Represent audio data. When the operator selects a script file by means of the Reader, audio output supports the selection of the script file. |
| Example | HdSound="..¥EPUDL¥LSOUND.WAV" |

Fig.11A

| Format of Parameter Name | HdCapacity |
|---|---|
| Number of Description in Section | 1 (Limited in Header Section) |
| Description Level | Option |
| Format of Parameter Value | Other than 0 in decimal notation. (0Ah to 0Fh in hexadecimal notation are not usable). |
| Description | The total capacity of objects (including images) defined by the script file is expressed by the unit of bytes.<br>When the Reader downloads and executes the script file in its own RAM, this is used to check the remaining storage capacity of the Reader. The operations under the condition of an insufficient storage capacity depend upon the specification of the Reader. |
| Example | HdCapacity=102400   (Example : In the case of 100K) |

Fig.11B

| Format of Parameter Name | HdThumbnail |
|---|---|
| Number of Description in Section | 1 (Limited in Header Section) |
| Description Level | Option |
| Format of Parameter Value | The name of a thumbnail file is quoted with " ".<br>The file name is specified by a relative path from the script file storage directory. |
| Description | The effective size of the thumbnail file ranges from 80×80 to 160×160 pixels. The extension of the specified file is *.usf. The file format follows JPEG. |
| Example | HdThumbnail="..¥EPUDL¥IMAGE¥001UDL.USF" |

Fig.12

| Format of Parameter Name | HdPhysicalPaperSize |
|---|---|
| Number of Description in Section | 1 (Limited in Header Section) |
| Description Level | Mandatory |
| Format of Parameter Value | Specify any of the following options:<br>HAGAKI:     Standard-Size Postcard<br>A6:     Standard Size A6<br>4x6:     Photo Card<br>A4:     Standard Size A4<br>A3:     Standard Size A3<br>A3N:     Long A3<br>R89:     Roll Paper of 89 mm in width<br>R100:     Roll Paper of 100 mm in width<br>RA4:     Roll Paper of A4 in width<br>RA3N:     Roll Paper of long A3 in width<br>R5IN:     Roll Paper of 5 inch in width<br>R4IN:     Roll Paper of 4 inch in width<br>Panoramic:     Panorama<br>Letter:     Letter<br>5x8:     5x8 in.<br>5x7:     5x7 in. (2L Size)<br>100x150:     100x150mm<br>3.5x5:     3.5x5 in. (L Size)<br>4x6NP:     4x6 in. (Photo Paper 4x5 in. No Perforations)<br>8x10:     8x10 in. |
| Description | Specify the size of printing paper expected according to the layout specified by the script file. The quality of printing is not guaranteed in the case of printing in a different paper size from the expected paper size or in the case of specifying the paper size not supported by the Reader. |
| Example | HdPhysicalPaperSize =4x6 |

Fig.13

| Format of Parameter Name | HdMargines |
|---|---|
| Number of Description in Section | 1 (Limited in Header Section) |
| Description Level | Mandatory |
| Format of Parameter Value | Specify any of the following options:<br>The values are arrayed in the order of the top, the bottom, the left, and the right.<br>42,42,42,42: 42dot/42dot/42dot/42dot (3mm/3mm/3mm/3mm)<br>42,198,42,42:<br>-42, -72, -36, -36 (Rimless on all the four sides)<br>-42, -72, -49, -49 (Rimless on all the four sides for the paper sizes of and over A3)<br>0,0,-36,-36(Roll Paper)<br>-36,-36,-36,-36(Roll Paper with Cutter Function) |
| Description | Specify the top, the bottom, the left, and the right margins by the unit of dots (360 dpi) on printing paper expected according to the layout specified by the script file.<br>The default values of the Reader are selected in the case of no specification of this parameter or in the case of specifying the parameter not supported by the Reader.<br>In the case of setting the margins for the roll paper with the cutter function, lengths corresponding to the top and the bottom margins are cut by means of the cutter. In the case of no use of the cutter, printing corresponding to the top and the bottom margins is omitted. The page length is specified to exclude the negative values of the top and the bottom margins.<br>In the case of specifying the rimless margins on all the four sides for the paper sizes of and over A3 (A3, and long A3), the set of values (-42,-72,-49,-49) is to be selected.<br>In the case of specifying these margins for the paper sizes less than A3 or in the case of specifying the standard rimless margins on all the four sides for the paper sizes of and over A3, the default values are to be selected for printing. |
| Example | HdMargines = 42,42,42,42 |

Fig.14A

| Format of Parameter Name | HdRollPaperLength |
|---|---|
| Number of Description in Section | 1 (Limited in Header Section) |
| Description Level | Option |
| Format of Parameter Value | Not less than 0 in decimal notation. |
| Description | In the case of specifying roll paper by the script file, the length of one page is set by the unit of 360 dpi. In the case of specifying the roll paper but not specifying this parameter or in the case of specifying the parameter not supported by the Reader, the default values of the Reader are to be selected. In the case of drifting specification by the DrawPicture parameter or in the case of specification of cut paper, this parameter is to be ignored. The effective range of specification is 500 to 15840 dots (44 inch). |
| Example | HdRollPaperLength = 3600 (10 inch) |

Fig.14B

| Format of Parameter Name | HdApplication |
|---|---|
| Number of Description in Section | 1 (Limited in Header Section) |
| Description Level | Option |
| Format of Parameter Value | The application identifier is quoted with " ". HdApplication = "Identifier" |
| Description | Specify the identifier for identifying application of interpretation of the application intrinsic section. In the case where the Reader does not correspond to the identifier or in the case of no description of the HdApplication parameter, the application intrinsic section is to be ignored. |
| Example | HdApplication = "PhotoQuicker20" |

Fig.15A

| Format | [PAGE] |
|---|---|
| Details | Represent the start of 1 Page. |
| Number of Description | 1 (in Script File) |
| Description Level | Mandatory |

Fig.15B

| Layer | Name of Parameter | Description Level | Outlines | Remarks |
|---|---|---|---|---|
| Drawing Layer | DrawPicture | O | Draw photograph data. | |
| | DrawLine | O | Draw lines. | |
| | DrawStrings | O | Draw letter strings. | |

Fig.16

DrawPicture ( "FileName", PhotoID, FrameX1, FrameY1, FrameX2, FrameY2,
Direction, Fitting, Alignment )

| Sequence of Description | Name of Parameter | Details and Format of Parameter |
|---|---|---|
| 1 | "FileName" | Specify the file name of photograph data. In the case of specification of PhotoID≠0, the specified file name is ignored. The file name is specified by a relative path from the script file storage directory. The file name is quoted with " ". In the case of specification of PhotoID≠0, the mark " " is to be inserted although the "FileName" is ignored. In the case of specifying the file name, the image size is not less than 32×32 pixels. |
| 2 | PhotoID | In the case of specifying the file name of photograph data, PhotoID=0 is to be described. Specification of PhotoID is required for selection of a photograph by the Reader. Integers starting from '1' are to be allocated to PhotoID. No missing number is allowed. PhotoID may not be unique. The identical settings for the PhotoID cause allocation of the same photographs. Photographs are allocated in the order of settings of PhotoID. The method of allocation depends upon the specification of the Reader. |
| 3 | FrameX1 | Specify the X coordinate of the upper left corner of a photo frame. |
| 4 | FrameY1 | Specify the Y coordinate of the upper left corner of the photo frame. |
| 5 | FrameX2 | Specify the X coordinate of the lower right corner of the photo frame. |
| 6 | FrameY2 | Specify the Y coordinate of the lower right corner of the photo frame. The settings of the following parameters are required in the case of specification of drifting print on roll paper. The maximum printable area for drifting print is 44 inch. Specification of Drifting Print = N |
| 7 | Direction | Specify the direction of clockwise rotation at the time of drawing the specified photograph data.<br>0: No rotation<br>1: Rotate by 90 degrees<br>2: Rotate by 180 degrees<br>3: Rotate by 270 degrees<br>4: Rotate automatically |
| 8 | Fitting | Specify the Fitting rules.<br>0:"FitOutside"  1:"FitWithin"  2:"FitAll" |
| 9 | Alignment | Specify the Alignment rules.<br>0:"LeftTop"  1:"LeftCenter"  2:"LeftBottom"<br>3:"CenterTop"  4:"CenterCenter"  5:"CenterBottom"<br>6:"RightTop"  7:"RightCenter"  8:"RightBottom" |

Fig.17

DrawLine ( StartX1, StartY1, EndX2, EndY2, LineWidth, LColorR, LColorG, LColorB)

| Sequence of Description | Name of Parameter | Details and Format of Parameter |
|---|---|---|
| 1 | StartX1 | Specify the X coordinate of the starting point of a line. Note) |
| 2 | StartY1 | Specify the Y coordinate of the starting point of the line. Note) |
| 3 | EndX2 | Specify the X coordinate of the end point of the line. Note) |
| 4 | EndY2 | Specify the thickness of the line by the unit of dot. |
| 5 | LineWidth | The allowable range for specification is 1 to 1280 dots. |
| 6 | LColorR | Specify the color component (Red) of the line in the range of 0 to 255. |
| 7 | LColorG | Specify the color component (Green) of the line in the range of 0 to 255. |
| 8 | LColorB | Specify the color component (Blue) of the line in the range of 0 to 255. |

Fig.18

DrawStrings( "FileName", PhotoID, "Strings", FrameX1, FrameY1, FrameX2, FrameY2, StrDirection, "FontName", FontSize, FFColorR, FFColorG, FFColorB )

| Sequence of Description | Name of Parameter | Details and Format of Parameter |
|---|---|---|
| 1 | "FileName" | The same as DrawPicture. |
| 2 | PhotoID | The same as DrawPicture. |
| 3 | Strings | Represent a letter string to be drawn. May include Macro variables. The drawable letter string includes only alphanumeric characters and has a range of 64 letters at most. The letter string converted by the Macro variables is created according to the information of photograph data specified by "FileName" or PhotoID. |
| 4 | FrameX1 | Specify the X coordinate of the upper left corner of a character box. |
| 5 | FrameY1 | Specify the Y coordinate of the upper left corner of the character box. |
| 6 | FrameX2 | Specify the X coordinate of the lower right corner of the character box. |
| 7 | FrameY2 | Specify the Y coordinate of the lower right corner of the character box. |
| 8 | StrDirection | Specify the direction of clockwise rotation of the specified letter string in the character box.<br>0: No ration<br>1: Rotate by 90 degrees<br>2: Rotate by 180 degrees<br>3: Rotate by 270 degrees |
| 9 | FontName | The font name is quoted by " ". When the specified font is not usable or when FontName is not specified, the standard font in the Reader is to be selected.<br>Specified Font Name : Courier , Gothic , Mincho , Helvetica, Roman |
| 10 | FontSize | Specify the letter size.0: 8point    1: 10point |
| 11 | FFColorR | Specify the color component Red of the letters in the range of 0 to 255. |
| 12 | FFColorG | Specify the color component Green of the letters in the range of 0 to 255. |
| 13 | FFColorB | Specify the color component Blue of the letters in the range of 0 to 255. |

Fig.19

DrawStrings( "FileName", PhotoID, "Strings", FrameX1, FrameY1, FrameX2, FrameY2, StrDirection, "FontName", FontSize, FFColorR, FFColorG, FFColorB )

| Macro Format | Comments | Output Results |
|---|---|---|
| %w | Abbreviated day of the week | Sun / Mon / Tue / Wed / Thu / Fri / Sat |
| %W | Day of the week | Sunday / Monday /···/Saturday |
| %d | Date | 1~31 |
| %D | Date (2 digits) | 01~31 |
| %g | Abbreviated name of month | Jan / Feb / Mar / Apr / May / Jun / Jul /Aug/ Sep / Oct/ Nov / Dec |
| %G | Name of month | January / February /···/ December |
| %L | Month (2 digits) | 01~12 |
| %t | am, pm (lower case) | am/pm |
| %T | AM, PM (upper case) | AM/PM |
| %f | Name of photo file | 123.jpg |
| %F | Full path of photo file name | c:¥misc¥123.jpg (No drive name for stand along printers) |
| %h | Time (12-hour notation) | 12 / 01~11 (0 o'clock is expressed as 12 o'clock.) |
| %H | Time (24-hour notation) | 00~23 |
| %m | Minute | 1~59 |
| %M | Minute (2 digits) | 01~59 |
| %n | Photo No. | 1 to 3 digits |
| %N | Photo No. (3 digits) | 001~999 |
| %S | Second (2 digits) | 01~59 |
| %y | Year (2 digits) | 00~99 |
| %Y | Year (4 digits) | Example: 2001 |
| %E | Time of Exposure | Example: 1/30 s. (The value of not less than 1 second is expressed by an integer. The value of less than 1 second is expressed by rounding figures after the decimal point in the denominator. Convert to seconds in the case of storage by Shutter Speed Value <APEX value.) |
| %U | F No. | Example: F2.8 |
| %I | ISO speed rate | Example: ISO100 |
| %A | Flash | ON/OFF |
| %C | Model name of image input device | Example: CP-900Z |
| %" | Double quotation | " |
| %% | % printing | % |

LAYOUT CONTROL FOR IMAGE OUTPUT

BACKGROUND OF THE INVENTION

1. Field of the Invention

The present invention relates to a technique of simply and easily outputting a document including an image in an arbitrary layout.

2. Description of the Related Art

There are a variety of known editing programs for editing and printing documents with images attached thereto. Some of the editing programs set image data provided by the user in a specific template and thereby complete a document.

Such prior art editing programs, however, do not enable the user to create the template freely and readily. In the case of printing a document in a desired layout, the user should create the document without using the template. This is significantly inconvenient. Time and labor consuming work is required especially in the case of outputting multiple documents with replacement of only images in a fixed layout. This problem is not restricted to printing, but is common to output of documents including images in any form.

SUMMARY OF THE INVENTION

The object of the present invention is thus to provide a technique of simply and readily outputting a document including an image in a desired layout.

In order to attain at least part of the above and the other related objects, the present invention is directed to a layout control program used for controlling a layout of image output in an image output device. The layout control program has: an output range defining function that defines a physical output range on an output medium, in which an image is output; and a layout specifying function that specifies a layout of the image in the defined output range. The layout specifying function includes multiple drawing control commands to individually adjust the output positions of multiple images, which are to be output in the defined output range. The sequence of arrangement of the multiple drawing control commands specifies the overlapping state of the multiple images. The drawing control commands are individually provided for the respective images. Required pieces of information for outputting the image, which include information for adjusting the output position, are integrated in each of the multiple drawing control commands.

The user creates the layout control program and transmits the layout control program to the image output device, thus ensuring easy output in a desired layout. In this layout control program, one drawing control command corresponds to one image, and the simple arrangement of the drawing control commands defines the overlapping state of the images. The required pieces of information for outputting each image are integrated in a single command. This arrangement enables the user to easily define and change the overlapping state and attain a desired layout. The layout control program provides a sort of template by specifying the layout of image output in advance.

In the present invention, the image output is, for example, printing or display. The physical output range represents, for example, the size of a printing sheet in the case of printing or the size of a display or a screen in the case of display. The layout control program may adopt any of diverse formats. One highly convenient format is a script file in which multiple commands are stored as text data.

In one preferable application of the layout control program of the invention, each of the multiple drawing control commands includes, as parameters, image file specification information specifying an image file to be output and a validity index representing validity of the image file specification information.

This arrangement enables a part with a fixed image file and a part with an arbitrary image file inserted therein at the time of output to be readily defined in the template specified according to the layout control program. For example, the fixed image file is effectively applicable for a background used in the template. The procedure specifies a fixed image file and sets the validity index to make the specification of the fixed image file valid. In the case of inserting an arbitrary image file at the time of output, the validity index is set to make the specification of the fixed image file invalid. In this case, the specification of the image file may be omitted. The validity index may be used to make the specification of the fixed image file invalid and also function as an index for specifying an image to be inserted.

In another preferable application of the layout control program of the invention, each of the multiple drawing control commands includes, as a parameter, coordinates of two points located at opposing corners of an oblong output frame, which are used to define the output frame for adjusting an output position of the image. The oblong may be rectangular or square.

This arrangement ensures easy definition of the output frame for the image. The arrangement of separately defining the output frame from the image ensures output in desired dimensions without specifically providing a trimmed image. One of the two points for defining the output frame may be unfixed, so that the output frame fitting in with the size of the image is automatically set. For example, the drawing control command may include, as parameters, image file specification information specifying an image file to be output, coordinates of one point in an oblong output frame for adjusting an output position of the image, and information for setting dimensions of the output frame to be fit in with dimensions of the image. The output frame may be polygonal, instead of oblong. In the case of a polygonal output frame, a specified number of points should be set to unequivocally define the output frame according to its shape.

In this application of defining the output frame, each of the multiple drawing control commands may include, as a parameter, information that is used to identify a method of fitting the image to the output frame. The method of fitting the image may resize or trim the image when the size of the image is not coincident with the size of the output frame. This parameter ensures a desired output even when the image is provided independently of the size of the output frame.

In the application of defining the output frame, each of the multiple drawing control commands may also include, as a parameter, information that is used to specify a relative positional relationship between the image and the output frame in a resulting output. The relative positional relationship may be a positional relation between the center position of the output frame and the center position of the image. This parameter also effectively functions to ensure a desired output.

Regardless of the specification of the output frame, in the layout control program of the present invention, each of the multiple drawing control commands may include, as a parameter, information that is used to regulate a rotating state of the image in a resulting output. This parameter allows for diverse layouts.

The layout control program of the present invention may include various pieces of information for regulating deformation of the output image, in addition to the parameters discussed above. Examples of such deformation parameters include a parameter 'Shear' for changing an oblong image into a parallelogram and a parameter 'Reflect' for inverting an image to an arbitrary axis in an axisymmetrical manner.

In one preferable embodiment, the layout control program of the present invention further includes one or multiple letter string control commands that are arranged in a predetermined sequence and are used to set an output form of one or multiple letter strings. Like the drawing control commands, the sequence of arrangement of the letter string control commands specifies the overlapping state of the letter strings. The letter strings to be output may be specified arbitrarily by the user or may be information included in the image file. The image file including information to be output as letters is, for example, an Exif format. In order to use such an image file, the letter string control command includes, as parameters, image file specification information specifying the image file and format specification information specifying an output format of the information included in the image file. This arrangement enables information intrinsic to a specified image, for example, the date of creation of the image file, to be output as a letter string.

In the case of application of the layout control program of the invention for printing, the output range defining function may have a size specification command that is used to specify dimensions of a printing sheet as the output medium; and a margin setting command that is used to set margins on the printing sheet. It is preferable that a negative value is allowable for the margin setting command. This arrangement permits definition of the output range protruding over the printing sheet and thereby readily specifies printing with no margin with regard to at least one side of the printing sheet. The setting of a negative value ensures a stable, desired output. The output range with no margin may be actualized by setting the value '0' to the margin. There is, however, still a possibility that a small margin is left due to a positional displacement of the printing sheet at the time of printing. The setting of a negative value, on the other hand, ensures stable rimless printing even under the condition of the positional displacement of the printing sheet. The setting of a negative value is not the only way of defining the output range including an extra area out of the printing sheet. Another procedure sets in advance the origin of a coordinate system, which is applied to define the output range, outside the printing sheet.

The output control program of the invention may be constructed by means of a text editor, but is preferably constructed by a file generation device that generates a file including description of the layout control program. The file generation device inputs a specification regarding a layout of image output in response to a user's operation, and provides the user with a resulting image laid out according to the specification in the form of printing or display. The file generation device generates the file in which the layout control program is described, in response to the user's input of a settlement instruction of the layout. The GUI (graphical user interface) is preferably used for the specification of the layout and the settlement instruction. This file generation device enables the user to set the layout while checking the actual output state.

The present invention is also directed to an image output device that outputs an image in a layout according to the layout control program discussed above. The image output device inputs the layout control program and image data specified by the drawing control commands included in the layout control program, arranges the image data in an overlapping relation corresponding to the arrangement of the drawing control commands, and outputs a resulting image according to the image data thus arranged. The positions and the sizes of the images are regulated, based on a diversity of parameters included in the drawing control commands. The image output device may be constructed as a printing device, a display device, or any other suitable form.

In one preferable embodiment, the image output device of the present invention is capable of treating image data that includes a transparency parameter to regulate the state of transparency in multiple stages. In the case of overlapping such image data with another image data, a specified transparency state is actualized by setting tone values in an image overlap area according to a predetermined operational expression including the transparency parameter and the tone values of both the image data. The regulation of the transparency state allows for a diversity of layouts and desirably enhances the convenience of the layout control program and the image output device.

The technique of the present invention is actualized by a diversity of other applications, for example, a computer readable recording medium in which the layout control program discussed above is recorded, a file generation method that generates a file in which the layout control program is described, a method of controlling an image output device according to the layout control program, and an image output method. Other applications include computer programs that attain the functions of the file generation device or the image output device described above, as well as recording media in which such computer programs are recorded.

Available examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

BRIEF DESCRIPTION OF THE DRAWINGS

FIG. 6 shows an example of description of a script in the embodiment;

FIGS. 7A and 7B show description of a header section;

FIGS. 8A through 8D show description of parameters included in the header section;

FIGS. 9A through 9C show description of parameters including in the header section;

FIGS. 10A through 10C show description of parameters included in the header section;

FIGS. 11A and 11B show description of parameters included in the header section;

FIG. 12 shows description of a parameter included in the header section;

FIG. 13 shows description of a parameter included in the header section;

FIGS. 14A and 14B show description of parameters included in the header section;

FIGS. 15A and 15B show description of a page section;

FIG. 16 shows description of a parameter DrawPicture;

FIG. 17 shows description of a parameter DrawLine;

FIG. 18 shows description of a parameter DrawString;

FIG. 19 shows macro variables; and

DESCRIPTION OF THE PREFERRED EMBODIMENTS

Figure 1:
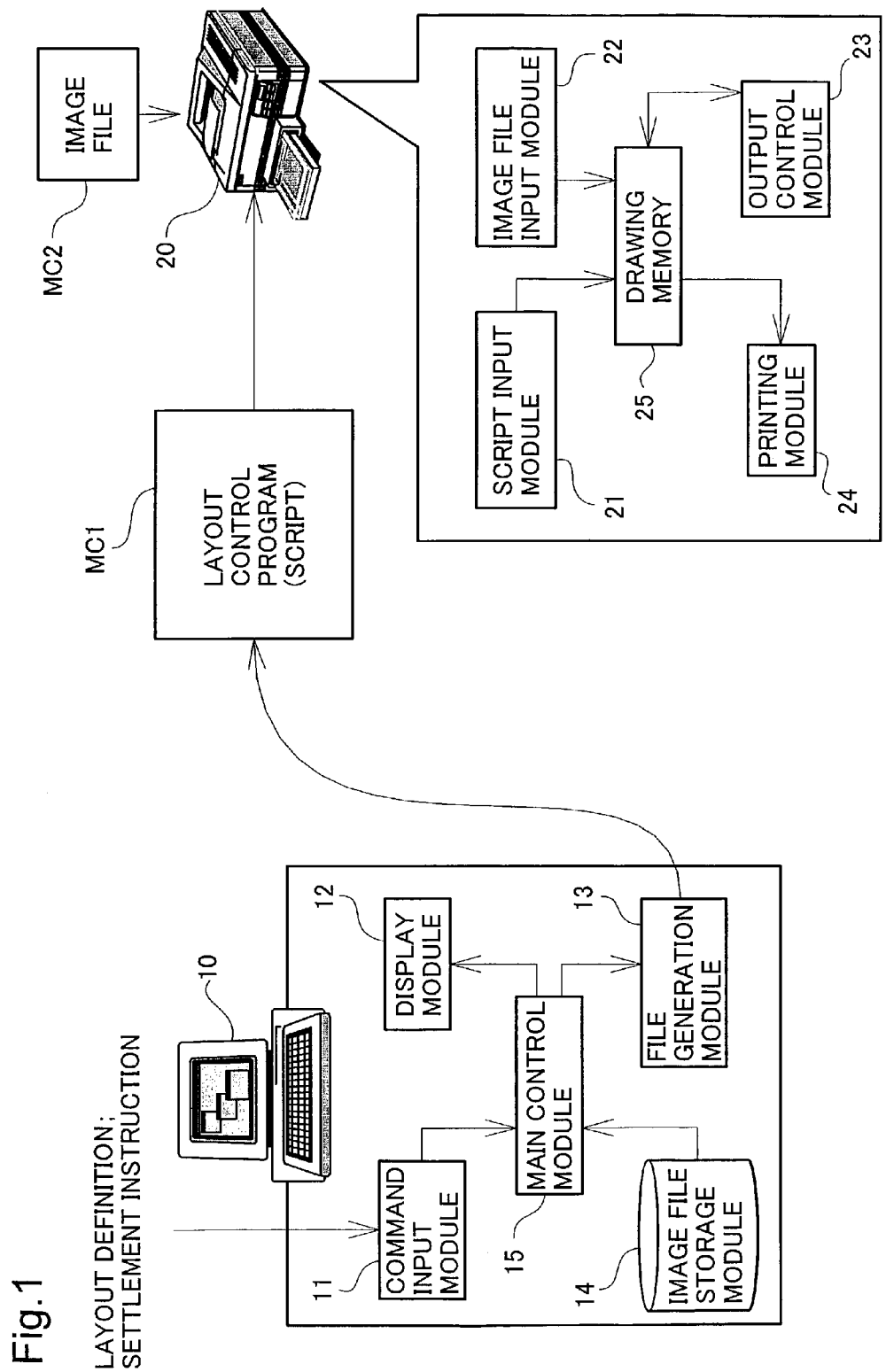
FIG. 1 schematically illustrates the construction of a printing system in one embodiment.

One mode of carrying out the present invention is discussed below in the following sequence:

A. System Construction
B. Definition of Layout
C. Script Generation Process
D. Script Description Method
E. Printing Process A. System Construction FIG. 1 schematically illustrates the construction of a printing system in one embodiment. The printing system includes a script generation device 10 that generates a layout control program (hereafter simply referred to as 'script' in the description of the embodiment), and a printer 20. The script generation device 10 is arranged by installing an application program for generating the script in a general-purpose personal computer. The personal computer reads the application program from a CD-ROM or another suitable recording medium or fetches the application program via the Internet or another network and installs the obtained application program. The functions as the script generation device 10 are attained by software in this embodiment, but may be actualized by an exclusive hardware structure.

The script generation device 10 has the function of generating the script to control the layout of printing by means of the printer 20. Functional blocks of the script generation device 10 are shown in the drawing. These functional blocks are constructed by a software configuration of the application program. In the script generation device 10, the respective functional blocks work under control of a main control module 15.

A command input module 11 receives an input command in response to a user's operation of an input device, such as a keyboard and a mouse included in the personal computer. The command includes a layout definition command and a layout settlement command. The layout definition command specifies a selected size of a printing sheet and a layout of images and letter strings in the printing sheet.

In response to input of the layout definition command, the main control module 15 generates a resulting image on which the specified layout is reflected, and transmits the generated image to a display module 12. The display module causes the transmitted image to be displayed on an internal display. In the case where the input command specifies an image file to be laid out, the main control module 15 extracts the specified image file from an image file storage module 14.

In response to input of the layout settlement command, the main control module 15 sends information on the settled layout to a file generation module 13. The file generation module 13 generates a script file, in which the script is recorded. The contents of the script will be discussed later. The script generation device 10 has a drive for writing in a memory card MC1. The resulting script file is recorded into the memory card MC1 by means of this drive.

The printer 20 of the embodiment is a stand alone printer that has a built-in printer driver and is capable of printing without connection with a computer. The printer 20 has a slot for reading a memory card, and a control panel that is manipulated for simple operations. The printer 20 has a control unit, which is constructed as a microcomputer including a CPU and memories. Functional blocks of the printer 20 are constructed by software to interpret the script and carry out printing in the specified layout.

These functional blocks are also shown in the drawing. In the printer 20, the respective functional blocks work under control of an output control module 25. A script input module 21 inputs the script recorded in the memory card MC1. The script input module 21 may have a function of storing the input script. The input script is transmitted to the output control module 25 at the time of executing a printing operation.

An image file input module 22 inputs an image file to be printed from a memory card MC2. The script of the embodiment may specify an image to be printed in advance, or may otherwise specify the image to be printed at the time of printing. The image file input module 22 is mainly used to input the image specified at the time of printing.

The output control module 25 reads the image file and creates an image to be printed in the specified layout, based on the script. A drawing memory 23 is utilized for creation of the image. A resulting image completed in the drawing memory 23 is transmitted to a printing module 24 to be printed. The printing module 24 has the functions as the printer driver.

FIG. 1 shows the system utilizing the stand alone printer 20. The output device is, however, not restricted to this printer, but may be a printer connecting with the computer. In this case, at least part of the functional blocks shown in FIG. 1 is constructed by a software configuration in the computer. The output device is not restricted to the printer but may be a display device, such as a display or a projector connecting with the computer.

B. Definition of Layout

Figure 2:
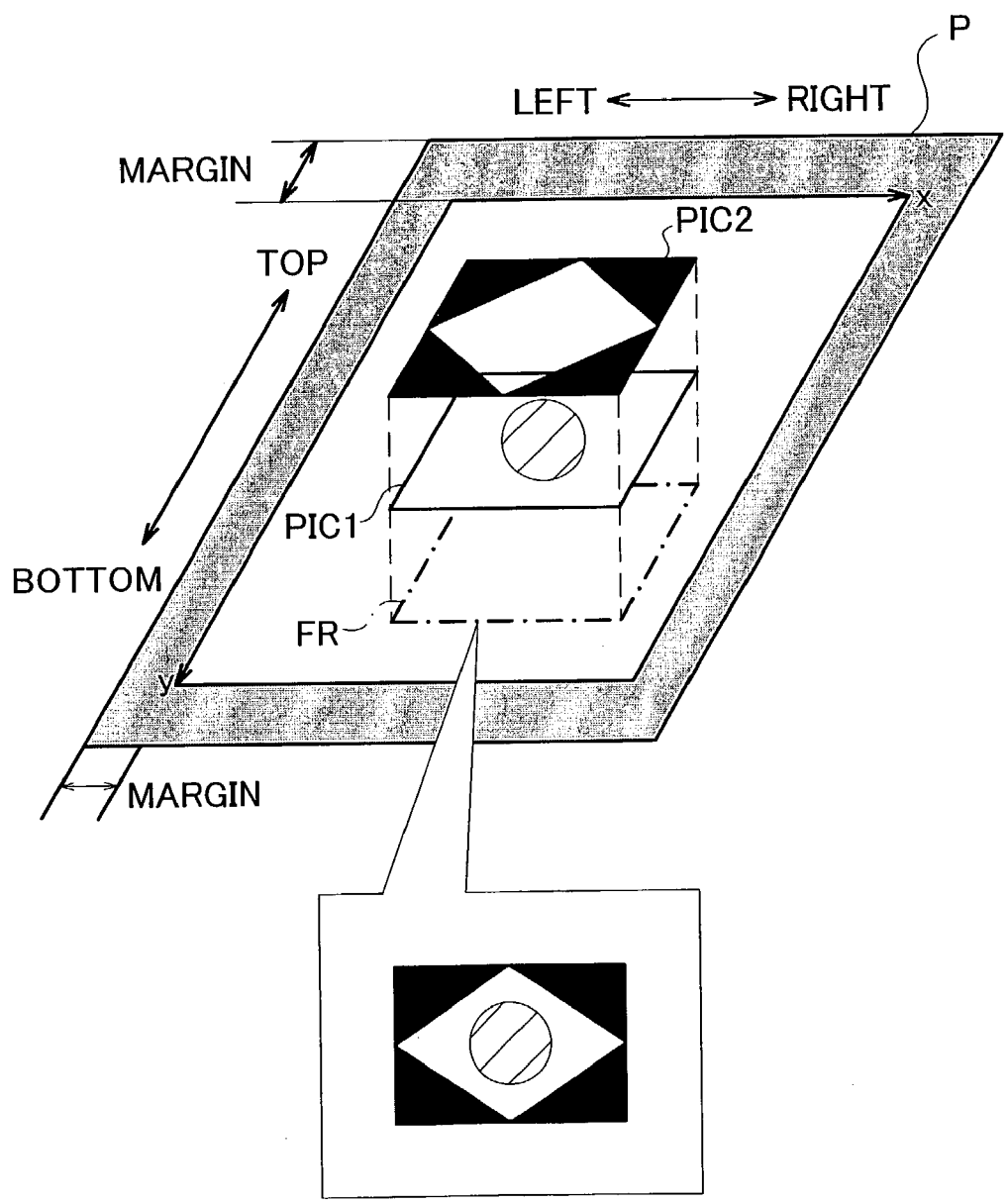
FIG. 2 shows definition of a layout in the embodiment.

FIG. 2 shows definition of the layout in the embodiment. The following description regards a case of output to the printer 20. The definition of the layout mainly includes definition of an output range and specification of an image layout in the output range.

In the case of the printer 20, the definition of the output range means specification of a physical range for image output, which includes size of a printing sheet and margins. A top margin and a left margin on a printing sheet P are shown in the drawing. A bottom margin and a right margin are set in a similar manner, although they are omitted from the illustration for simplicity of the drawing. A white area other than the margins represents a printing range. In the case of output to a display device, instead of the printer, the output range is defined according to the size of a display or a screen, in place of the printing sheet.

In this embodiment, each margin may take a negative value. Setting the negative value to the margin means that the printing range protrudes over the printing sheet P. Such setting allows printing without margins, that is, 'rimless printing'. If there is no positional displacement of the printing sheet in the printer 20, setting a value '0' to the margin attains the rimless printing. In the actual state, however, there is a possibility that a small margin is left due to the positional displacement of the printing sheet. The procedure of this embodiment sets a negative value to the margin and thereby prevents any small margin from being left due to the positional displacement of the printing sheet, thus ensuring stable rimless printing.

The image layout is defined by a photo frame FR. The photo frame FR is set by drawing an oblong frame in the printing range displayed on the script generation device 10 with a mouse. The position of the oblong frame is specified according to coordinates on x and y axes shown in the drawing. An image file to be attached to the photo frame FR is set, in addition to the settings of the position and the size of the photo frame FR. The photo frame FR is one-to-one mapped to an image PIC1. As mentioned previously, the image file may be specified in advance or may be specified occasionally at the time of printing. The illustrated example shows the case where the image PIC1 is specified relative to the photo frame FR. A resulting print includes the image PIC1 set in the photo frame FR.

The image layout may be defined in an overlapping state of multiple images. In the illustrated example, an image PIC2 is superimposed on the image PIC1. The image PIC2 has a blank area defined as 'transparent'. The format of such an image will be discussed later. As described above, a photo frame is one-to-one mapped to an image. Two photo frames respectively corresponding to the two images PIC1 and PIC2 are arranged at an identical position. In the case of the overlapped layout of multiple images, the image PIC1 is brimmed by the image PIC2 in a resulting print. For convenience of explanation, in the illustrated example, the images PIC1 and PIC2 of an identical size are overlapped with each other at an identical location. The two images may be arranged in a partly overlapping manner.

The definition of the image layout according to the photo frame advantageously ensures flexible replacement of images at the time of printing and readily attains a variety of layouts irrespective of the size of the image to be inserted.

Figure 3:
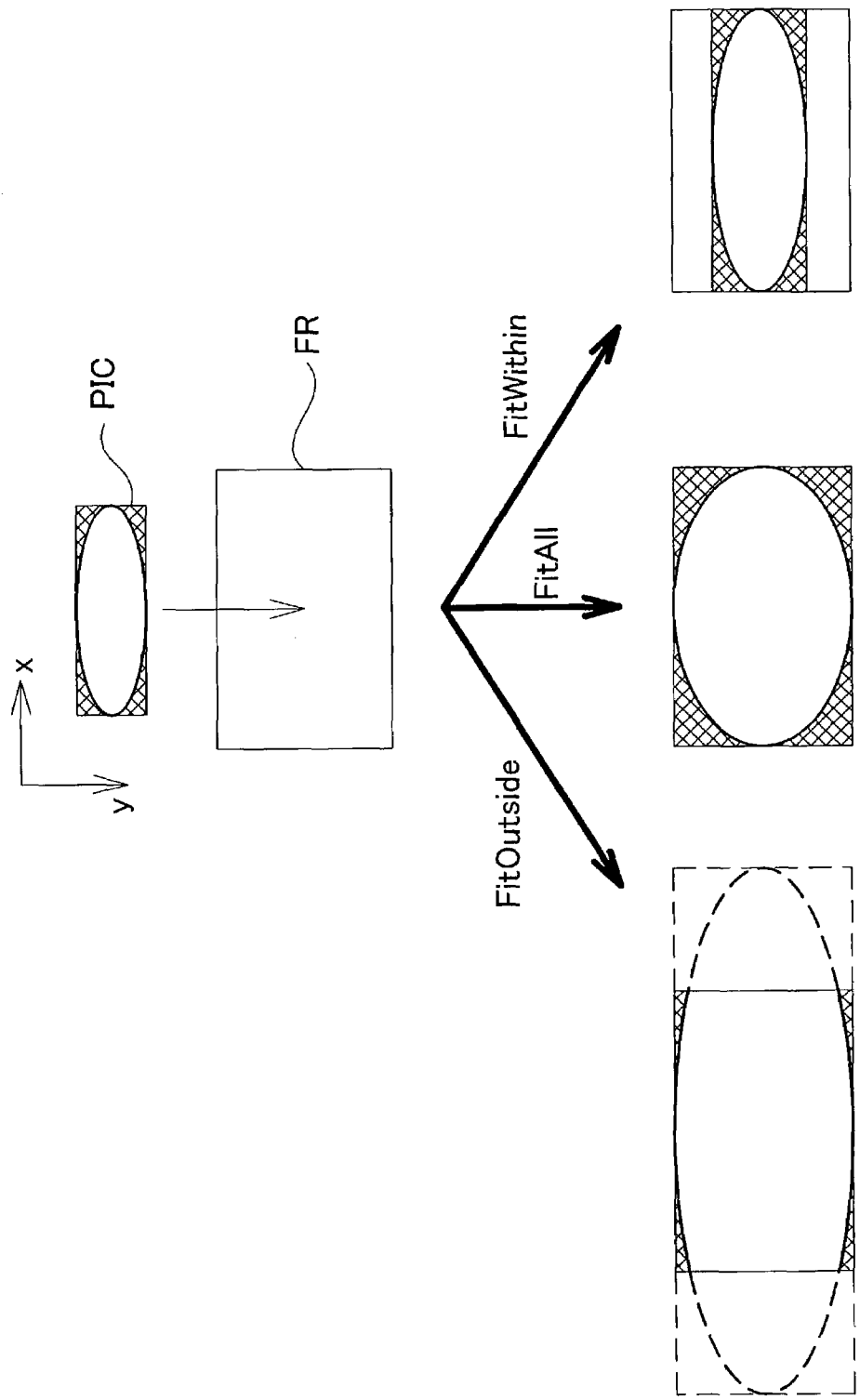
FIG. 3 shows rules for fitting an image to a photo frame.

FIG. 3 shows rules for fitting the image to the photo frame. In this example, the image PIC is set in the photo frame FR. The size and the aspect ratio of the image PIC are different from those of the photo frame FR. In this case, the procedure of the embodiment changes the size and the aspect ratio of the image PIC to fit the size and the aspect ratio of the photo frame FR. Three rules FitOutside, FitAll, and FitWithin are applied for the change.

The rule FitOutside changes the size of the image PIC to set the image PIC over the whole surface of the photo frame FR, while maintaining the aspect ratio of the image PIC. Namely the X direction and the Y direction have an identical magnification. In the case where the aspect ratio of the image PIC is different from the aspect ratio of the photo frame FR, either the left and right ends or the upper and lower ends of the image PIC are cut before the layout.

The rule FitWithin changes the size of the image PIC to set the whole image PIC in the photo frame FR, while maintaining the aspect ratio of the image PIC. In the case where the aspect ratio of the image PIC is different from the aspect ratio of the photo frame FR, margins are set on either of the left and right sides or the upper and lower sides of the image PIC.

The rule FitAll changes the size of the image PIC to make the size of the image PIC coincident with the size of the photo frame FR. In the case where the aspect ratio of the image PIC is different from the aspect ratio of the photo frame FR, the x direction and the y direction have different magnifications. The image PIC is thus magnified either in the horizontal direction or in the vertical direction.

Figure 4:
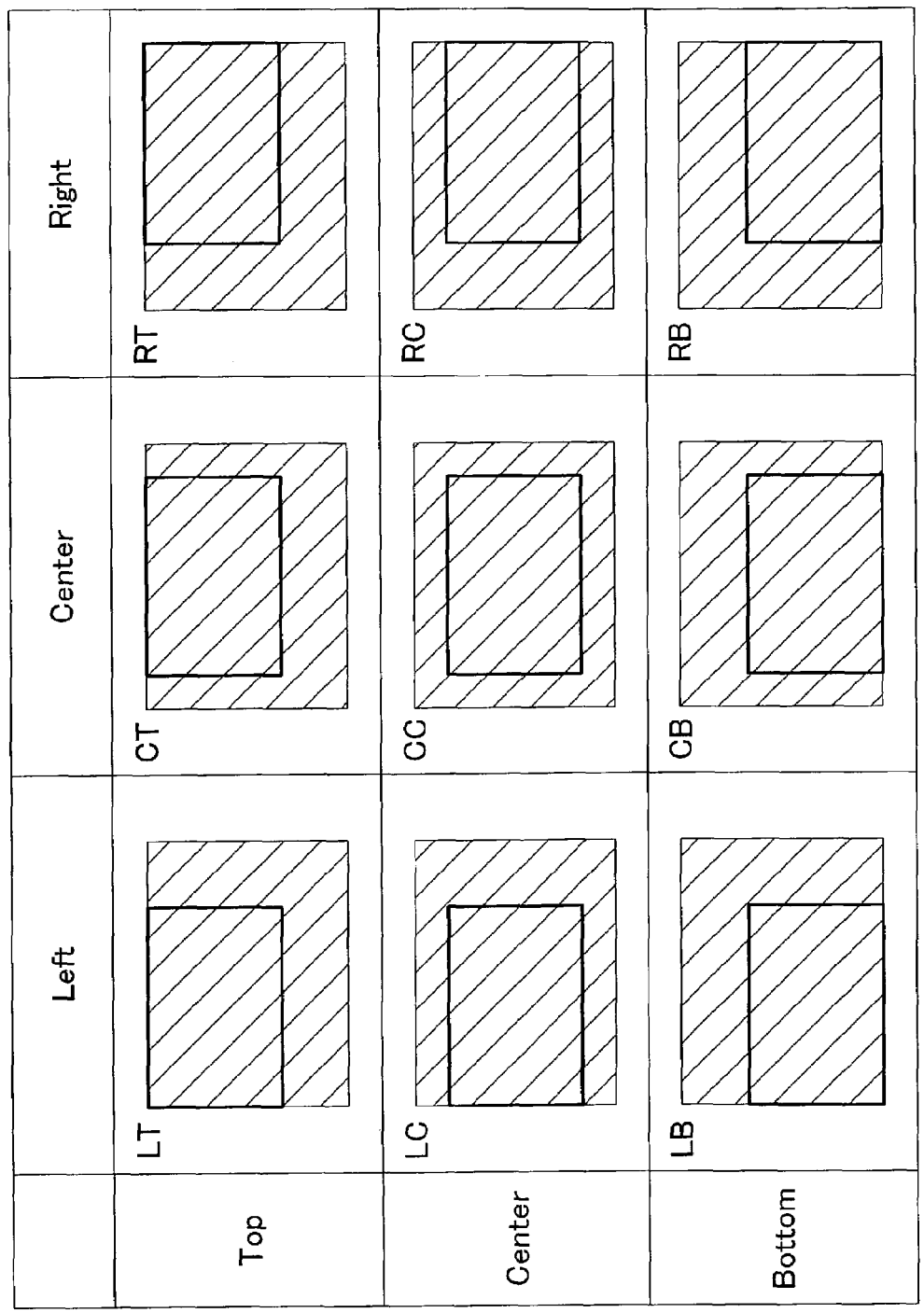
FIG. 4 shows relative positional relations between the photo frame and the image.

The rules FitOutside and FitWithin give some degree of freedom to the positional relationship between the photo frame FR and the resulting processed image PIC. The procedure of the embodiment allows the layout of the photo frame and the image to be selected among nine settings FIG. 4 shows relative positional relations between the photo frame and the image. Each hatched portion represents the image, and each rectangle included in the hatched portion represents the photo frame. For the better understanding of the relative positional relation, the size of the image is greater than the size of the photo frame in this embodiment. In the case of changing the size of the image according to the rule FitOutside and according to the rule FitWithin, the nine settings for the positional relationship may include the relative positional relations that have practically the same printing results.

The positional relation between the photo frame and the image is defined by reference points set in the photo frame and the image. The output layout of the photo frame and the image is determined to make the two reference points coincident with each other. In this embodiment, combinations of three positions for the reference point in the vertical direction, 'Top', 'Center', and 'Bottom' with three positions for the reference point in the horizontal direction, 'Left', 'Center', and 'Right' give the total of nine settings for the positional relationship. For example, in the case of positional relation LT (Left-Top), the reference points are set at the upper left vertexes of the photo frame and the image. For the other eight settings, the reference point is similarly defined by the combination of the position in the vertical direction with the position in the horizontal direction. In this embodiment, the three positions are specified for the reference point both in the vertical direction and in the horizontal direction. Any greater number of positions may be specified for the reference point.

C. Script Generation Process

Figure 5:
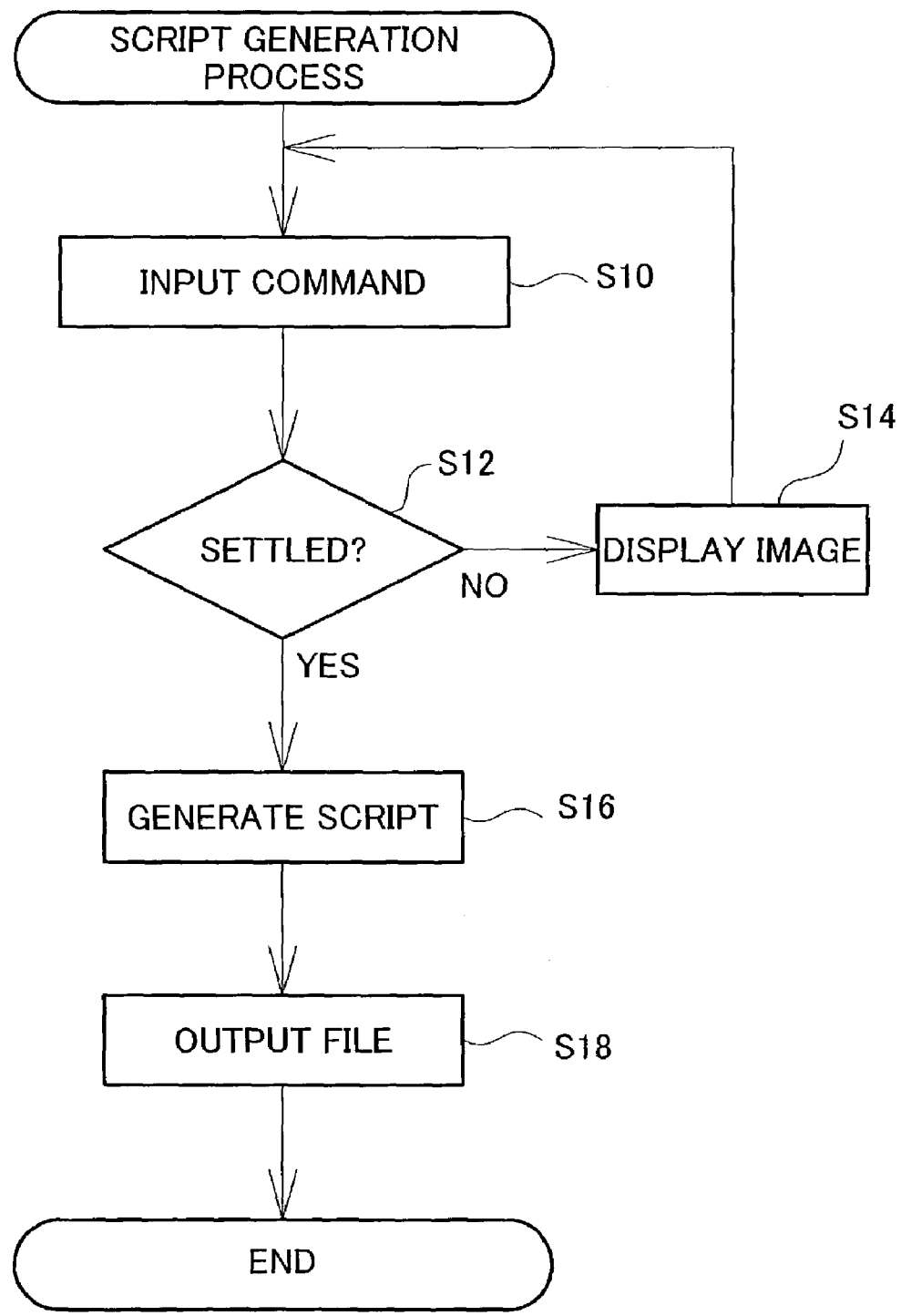
FIG. 5 is a flowchart showing a script generation process.

FIG. 5 is a flowchart showing a script generation process, which is executed by the script generation device 10. The script generation device 10 continually receives the user's input commands and displays the image with reflection of the input commands until settlement of a final layout (steps S10 through S14). The input commands are used to set the layout shown in FIGS. 2 through 4, and include those for the settings of the printing range, the settings of the photo frame, the settings of the image to be arranged in the photo frame, the settings of the fitting rule, and the settings with regard to the relative positional relationship between the photo frame and the image. Letter strings and partition lines to be printed with the images are also set by these commands.

On settlement of the final layout, the user inputs a settlement command to the script generation device 10 (step S12). The script generation device 10 then generates the script according to rules discussed below (step S16) and outputs a resulting image file (step S18).

D. Script Description Method

FIG. 6 shows description of a script in this embodiment. The script for defining the layout may be generated according to a diversity of rules. Here shows one preferable example. For convenience of explanation, respective lines in the script have line numbers L1 through L24 shown on the left side.

As illustrated, the script of the embodiment has a header section and a page section. The header section includes lines L1 to L14 starting with the notation [HEADER] and defines the output range. In this embodiment, the header section is located in a first part of the script. The page section includes lines L15 to L24 starting with the notation [PAGE] and specifies the image layout. In this embodiment, only one head section and one page section are included in one script.

The script may also include information intrinsic to the device that interprets and executes the script, the printer 20 in this embodiment. Such information may be included in, for example, an application section and described after the notation [Application].

FIGS. 7A and 7B show description of the header section. FIG. 7A shows a rule for describing a delimiter in the header section (that is, L1 in FIG. 6). The level 'Mandatory' represents that the description is essential.

FIG. 7B shows a list of parameters included in the header section. The description level 'M' represents essential parameters and the description level 'O' represents optional parameters. As illustrated, these parameters describe various pieces of information including the version of an editor used for generating the script, the size of the printing sheet, and the margins.

FIGS. 8A through 8D, FIGS. 9A through 9C, FIGS. 10A through 10C, FIG. 11A, FIG. 11B, FIG. 12, FIG. 13, FIG. 14A, and FIG. 14B show description of the respective parameters included in the header section. These drawings show the details of the description of the respective parameters. All the parameters are thus not further described in the specification hereof.

As shown in FIG. 12, a parameter 'HdphysicalPaperSize' in the header section sets the size of the printing sheet. In this embodiment, roll papers of diverse widths are selectable options. In the case of selection of a roll paper, a parameter 'HdRollPaperLength' shown in FIG. 14A is set to specify the length of the roll paper. Another application for the roll paper does not set the length in advance but specifies the cut length according to each image size.

As shown by a parameter 'HdMargins' in FIG. 13, the margins on the printing paper may take negative values. The significance of the negative values has been explained previously with reference to FIG. 2. In this embodiment, the setting of negative values to all the four margins and the setting of negative values to the left and right margins in the case of roll paper are selectable options. The setting may permit a negative value to at least one arbitrary margin.

FIGS. 15A and 15B show description of the page section. FIG. 15 shows a rule of describing a delimiter in the page section (that is, L15 in FIG. 6). FIG. 15B shows a list of parameters included in the page section. The settings include a parameter DrawPicture for drawing photograph data, a parameter DrawLine for drawing lines, and a parameter DrawStrings for drawing letter strings. The page section may further include other parameters.

As shown in the example of the description in FIG. 6, a number of these parameters are included in the page section. Each parameter corresponds to drawing of one photograph, one line, or one letter string (hereafter generically referred to as object). Description of multiple parameters thus enables multiple objects to be drawn on a printing sheet. The sequence of the parameters in the description defines the overlapping state of the objects. In this embodiment, the object corresponding to the parameter described later is drawn over the object corresponding to the parameter described earlier. The mapping of the overlapping state to the sequence of description may be reversed. Mapping of the overlapping state to the sequence of description enables the user to readily set and change of the overlapping state of the objects.

FIG. 16 shows description of the parameter DrawPicture. This parameter includes 9 parameters. A parameter 'FileName' is used to specify in advance an image to be printed by the script. A parameter 'PhotoID' is used to control the validity of the parameter FileName. The specification by the parameter FileName is valid only when the value '0' is set to the parameter PhotoID. When the parameter PhotoID is an integer of not less than 1, the specification by the parameter FileName is invalid and an image file is independently specified at the time of printing. The parameter PhotoID functions as the identifier at the time of such specification.

The parameter DrawPicture also includes parameters for specifying the two points on the upper left corner and the lower right corner of the photo frame. Specification of drifting print, where the Y coordinate on the lower right corner is unfixed, is allowable. This specification enables the size of the photo frame to be altered according to the size of the photograph, which is attached to the photo frame.

The parameter DrawPicture further includes parameters for specifying the attachment state of an image to the photo frame, that is, parameters for defining the rotation, the Fitting rules, and relative positional relationship (the Alignment rules). The restrictive settings in this example are only illustrative, but diverse settings are allowable.

FIG. 17 shows description of the parameter DrawLine. The parameter DrawLine includes parameters for specifying the starting point, the end point, the thickness, and the color of a straight line. The object is only the straight lines in this example, but may include curves and figures.

FIG. 18 shows description of the parameter DrawStrings. This embodiment adopts either of the method of presetting a letter string to be printed and the method of specifying a letter string based on information included in an image file. The former method concretely sets a letter string to be printed by the parameter Strings. The latter method specifies an image file including information to be converted to a letter string by the parameters FileName and PhotoID. The parameter Strings specify the information to be obtained and the display format of the information by macro variables.

FIG. 19 shows macro variables, which include information on the day of the week, the date, and the time of creation of the image file, the photograph number, and information on the shooting conditions like the time of exposure. These pieces of information are described in a header section, for example, in an image file in conformity with the Exif standard.

The script generation device 10 generates a script file according to the rules discussed above. The description of the script is not restricted to the above example, but a diversity of settings are applicable for the description of the script. The control program used for controlling the layout of printing with the printer 20 is not restricted to the format of the script.

E. Printing Process

Figure 20:
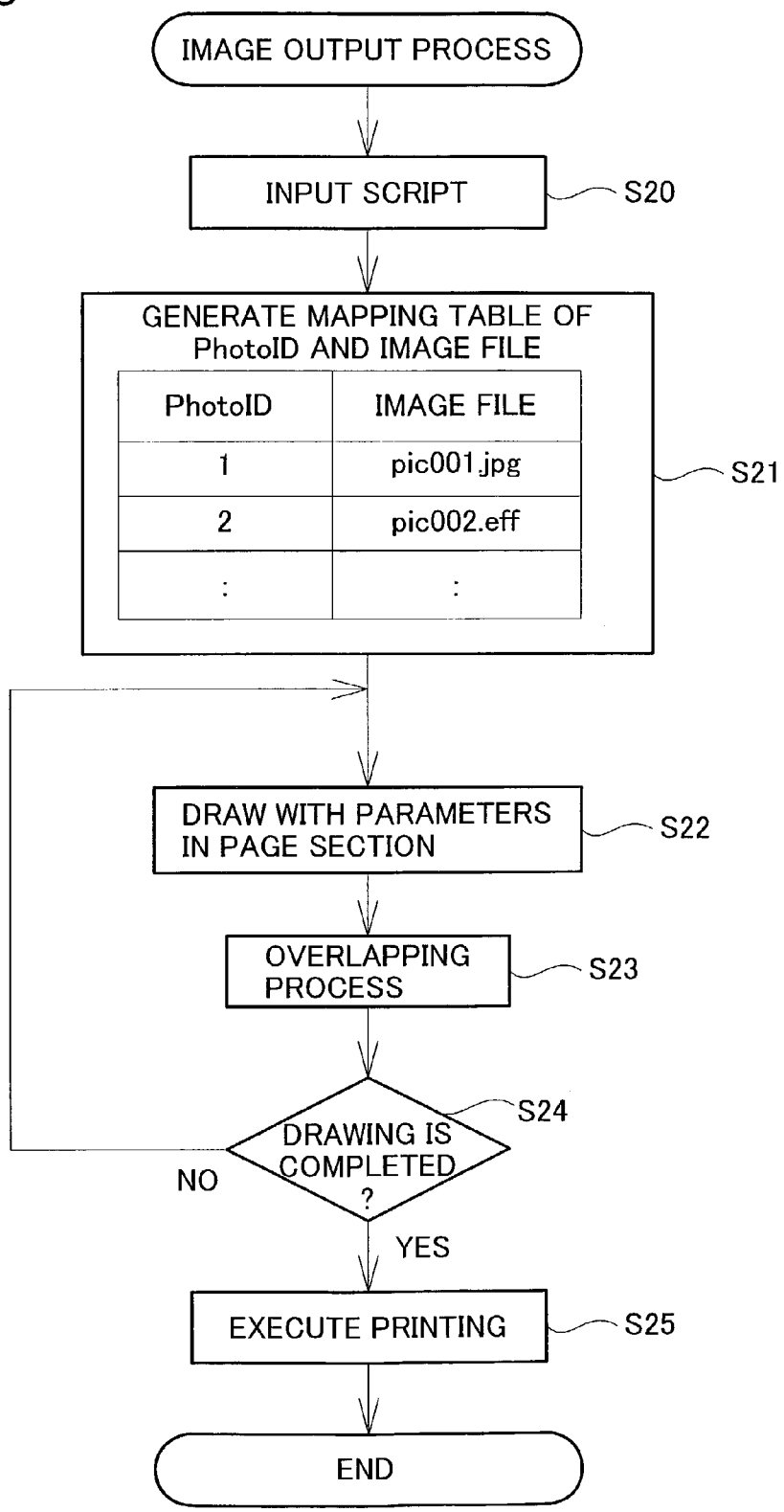
FIG. 20 is a flowchart showing a printing process.

FIG. 20 is a flowchart showing a printing process, which is executed by the control unit of the printer 20. In response to an instruction of image output, the control unit inputs the script discussed above (step S20). The control unit may read the script from a recording medium, such as a memory card, or extract the script from the internal memory.

The control unit subsequently creates a mapping table of the parameter PhotoID and the image file used in the script (step S21). As described previously, when the parameter includes one or multiple settings of the parameter PhotoID in the script, a resulting print includes specified image files. The process of step S21 sets the mapping for the specification. An example of the mapping table of the parameter PhotoID and the image file name is shown with the flowchart. The mapping is set by displaying the table on the control unit of the printer 20 and inputting the user's allocation of image files. The image file may be stored in advance inside the printer 20 or may be read from the memory card.

After setting the mapping table, the control unit executes drawing with the parameters included in the page section (step S22). In response to the parameter DrawPicture, the control unit fetches a corresponding image file and locates the image at a specified position. When a value of not less than 1 is set to the parameter PhotoID, the image file to be attached is set according to the mapping table created at step S21. In response to the parameter DrawLine, the control unit draws a line of the specified thickness and the specified color at the specified position. In response to the parameter DrawStrings, the control unit draws a specified letter string. In the case of application of the macro variables, the letter string is generated with information included in the specified image file.

The control unit carries out an overlapping process in the course of drawing according to the requirements (step S23). As described previously, in the script of the embodiment, the sequence of description of the parameters defines the overlapping state of objects. The objects corresponding to the parameters described later in the script are successively superimposed. The overlapping may be easily attained by overwriting a new object, whether or not an object has already been located in a certain pixel. The procedure of the embodiment, however, treats images including transparent parts. In the case of overlapping such images, the specific overlapping process is required to ensure the transparency.

Prior to explanation of the details of the overlapping process, the structure of the image file to be treated in this embodiment is discussed. A color image is generally expressed by tone values of three primary colors, red (R), green (G), and blue (B). In the JPEG format, the YCbCr color space is used in the compression process. The values in the YCbCr color system are, however, converted to tone values of the colors R, G, and B in the drawing process. In this embodiment, the image is expressed by 8-bit tone values for the respective R, G, and B colors.

The image file processed in this embodiment may include 8-bit information on the transparency as a different fourth 8-bit channel, in addition to the 8-bit tone values for the three colors R, G, and B. This fourth channel is called the alpha channel. The alpha channel has 8-bit data, that is, a data value in the range of 0 to 255, with regard to each pixel. The data value equal to '0' represents that the pixel is completely opaque. The data value equal to '255' represents that the pixel is completely transparent. Intermediate data values represent varying degrees of transparency in multiple stages.

In the case of overlapping images with the alpha channel, the tone values of each pixel are specified according to equations given below:

$$R=\{Rp\times A+Rt\times(255-A)\}/255;$$

$$G=\{Gp\times A+Gt\times(255-A)\}/255;$$

$$B=\{Bp\times A+Bt\times(255-A)\}/255;$$

R, G, B: tone values of a resulting composite image
Rp, Gp, Bp: tone values of an underlaid image
Rt, Gt, Bt: tone values of an overlaid image
A: data value of the alpha channel In the case of an image without the alpha channel, for example, a general JPEG image or a bitmap image, the overlapping process may be skipped or the overlapping process may be carried out with the default data value '0'. The image file treating the transparency is not restricted to the file format of this embodiment, but may be a known transparent GIF. The transparent GIF is, however, not capable of varying the degree of transparency in multiple stages, unlike the file format discussed above. In the case of the transparent GIF, the procedure sets the data value '255' of the alpha channel to pixels with the transparent shade specified and the data value '0' to the other pixels.

The control unit repeats the drawing of the objects and the overlapping process, until processing of all the parameters described in the script has been completed (steps S22 to S24). The control unit executes actual printing (step S25) on completion of the drawing of all the objects. This printing process is equivalent to the general processing executed by a printer driver. The procedure of this embodiment executes actual printing after completion of the drawings based on all the parameters. Printing may, however, be executed in parallel to the drawing with the parameters. Even when the drawing of all the objects has not yet been completed, the modified procedure starts printing on completion of a certain set of drawing, which allows for a start of printing. The procedure then carries out the printing in parallel to the drawing.

As discussed above, the printing system of the embodiment utilizes the script and thereby enables a desired image to be readily set in a desired layout and printed. The script has the relatively simple construction and is thus easily generated and processed for output. The overlapping state of objects is defined by the sequence of description of the parameters for drawing the objects. This arrangement ensures easy definition and change of the overlapping state.

The above embodiment and its modifications are to be considered in all aspects as illustrative and not restrictive. There may be many modifications, changes, and alterations without departing from the scope or spirit of the main characteristics of the present invention. For example, the series of control processing discussed above may be actualized by a hardware configuration, instead of the software.

What is claimed is:

1. A computer-readable storage medium encoded with a layout control program, said layout control program causing a computer to arbitrarily control a layout of image output from an image output device, said layout control program causing the computer to attain:

an output range defining function that defines a physical output range on an output medium, in which an image is output; and a layout specifying function that specifies a layout of the image in the defined output range, said layout specifying function having multiple drawing control commands that are provided respectively for a plurality of images to be output in the output range, wherein required pieces of information for outputting the image, which include information for adjusting an output position, are integrated in the drawing control command corresponding to the image, the multiple drawing control commands are arranged in a preset sequence according to an overlapping state of the plurality of images, the overlapping state of the plurality of images defining, when the plurality of images overlap, which of the images is drawn in an overlapping part, and each of the multiple drawing control commands includes, as a parameter, coordinates of two points located at opposing corners of an oblong output frame, which are used to define the output frame for adjusting an output position of the image, with size and aspect ratio of the output frame being determined irrespective of size and aspect ratio of the image;

information that is used to identify a method of fitting the image to the output frame when at least one of the size and the aspect ratio of the image is different from the size and the aspect ratio of the output frame, the method of fitting defining a manner in which the image is transformed allowing a change of aspect ratio of the image so that at least a part of the transformed image is disposed within an area defined by the output frame; and information that is used to specify a relative positional relationship between the transformed image and the output frame in a resulting output.

2. An image output device that outputs an image in a layout according to a predetermined layout control program, said layout control program comprising:

an output range defining function that defines a physical output range on an output medium, in which an image is output; and a layout specifying function that specifies a layout of the image in the defined output range, said layout specifying function having multiple drawing control commands that are provided respectively for a plurality of images to be output in the output range, wherein required pieces of information for outputting the image, which include information for adjusting an output position, are integrated in the drawing control command corresponding to the image, the multiple drawing control commands are arranged in a preset sequence according to an overlapping state of the plurality of images, the overlapping state of the plurality of images defining, when the plurality of images overlap, which of the images is drawn in an overlapping part, and each of the multiple drawing control commands includes, as a parameter, coordinates of two points located at opposing corners of an oblong output frame, which are used to define the output frame for adjusting an output position of the image, with size and aspect ratio of the output frame being determined irrespective of size and aspect ratio of the image;

information that is used to identify a method of fitting the image to the output frame when at least one of the size and the aspect ratio of the image is different from the size and the aspect ratio of the output frame, the method of fitting defining a manner in which the image is transformed allowing a change of aspect ratio of the image so that at least a part of the transformed image is disposed within an area defined by the output frame; and information that is used to specify a relative positional relationship between the transformed image and the output frame in a resulting output;

said image output device comprising:

an input module that inputs said layout control program;

an image input module that inputs image data specified by the multiple drawing control commands; and an image output module that arranges the image data in an overlapping relation corresponding to the arrangement of the multiple drawing control commands and outputs a resulting image according to the image data thus arranged.

3. A computer-readable storage medium encoded with an image output program, said image output program causing a computer to output an image in a layout according to a predetermined layout control program, said layout control program comprising:

an output range defining function that defines a physical output range on an output medium, in which an image is output; and a layout specifying function that specifies a layout of the image in the defined output range, said layout specifying function having multiple drawing control commands that are provided respectively for a plurality of images to be output in the output range, wherein required pieces of information for outputting the image, which include information for adjusting an output position, are integrated in the drawing control command corresponding to the image, the multiple drawing control commands are arranged in a preset sequence according to an overlapping state of the plurality of images, the overlapping state of the plurality of images defining, when the plurality of images overlap, which of the images is drawn in an overlapping part, and each of the multiple drawing control commands includes, as a parameter, coordinates of two points located at opposing corners of an oblong output frame, which are used to define the output frame for adjusting an output position of the image, with size and aspect ratio of the output frame being determined irrespective of size and aspect ratio of the image;

information that is used to identify a method of fitting the image to the output frame when at least one of the size and the aspect ratio of the image is different from the size and the aspect ratio of the output frame, the method of fitting defining a manner in which the image is transformed allowing a change of aspect ratio of the image so that at least a part of the transformed image is disposed within an area defined by the output frame; and information that is used to specify a relative positional relationship between the transformed image and the output frame in a resulting output;

said image output program causing the computer to attain the functions of:

inputting said layout control program;

inputting image data specified by the multiple drawing control commands; and arranging the image data in an overlapping relation corresponding to the arrangement of the multiple drawing control commands and outputting a resulting image according to the image data thus arranged.

* * * * *